Figure 1:
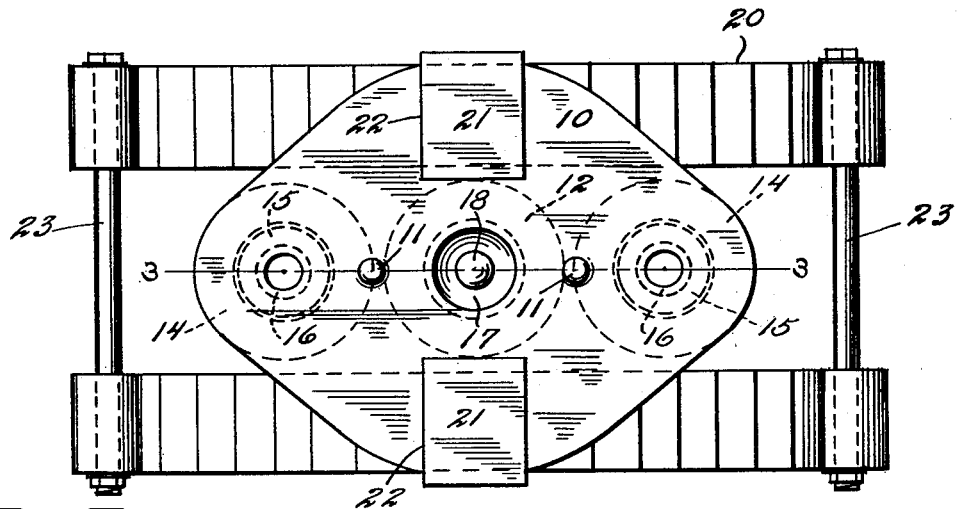

May 15, 1934.  P. R. DRENNING  1,958,848

RAILWAY TRUCK SPRING

Filed Sept. 16, 1931

Inventor
Percy R. Drenning
By John Milton Jester
Attorney

Patented May 15, 1934

1,958,848

UNITED STATES PATENT OFFICE 1,958,848

RAILWAY TRUCK SPRING

Percy R. Drenning, Baltimore, Md., assignor to T. H. Symington & Son, Inc., Baltimore, Md., a corporation of Maryland Application September 16, 1931, Serial No. 563,189

13 Claims. (Cl. 267—3)

The invention relates to resilient load sustaining means and has special reference to spring suspension or supporting means for the bolsters of railway car trucks and the like.

The principal object of the invention, generally stated, is to provide a novel spring combination and arrangement calculated to provide easier riding qualities under light load conditions, to increase the total spring capacity, and to prevent the usual objectionable "jiggle" or vertical oscillation which, if permitted to build up, may become of such amplitude and violence as to throw the bolster clear off from the springs.

It is known that with the ordinary spring construction involving a nest, cluster or assembly of either single or double coil springs, or a combination of both, all of the same height, travel and capacity, the spring resistance is too stiff under light loads or, if proper under light loads, insufficient in capacity to take care of the maximum loads. Furthermore as the ordinary springs are usually of the same character as regards height, travel and capacity they all naturally have the same or substantially the same period of vibration and the result is that the inevitable vertical oscillation builds up when synchronized with the shocks or jars caused by passage of the car wheels over the rail joints to such an extent that the truck bolster moves up and down upon the springs with such amplitude of vibration that the bolster may be thrown off, resulting in unloading of the wheels and possible consequent derailment, not to mention the tremendous damage done particularly to perishable goods.

It is with the above facts in view that I have devised the present invention which has for an important object the provision of a novel truck spring assembly embodying a combination of elliptic and helical springs, the two types having different natural periods of vibration and consequently acting as a check one upon the other for breaking up synchronization of oscillation and thereby preventing jiggle.

Another object of the invention is to provide a spring assembly of such arrangement that the initial load comes upon the elliptic springs so that they will be partially compressed before the helical springs are deflected, this being advantageous on account of the superior riding qualities of the elliptic springs at least under light load conditions.

Another important object of the invention is to provide a spring assembly of this character which may be made to replace the usual helical spring nest without involving any changes whatsoever in the construction of the truck in which it is used.

A further object of the invention is to provide a spring nest which may be constructed and assembled as a complete and separate entity and handled as such so as to be capable of installation as a replacement for a standard nest without involving manipulation of the individual parts at such a time.

An additional object is to provide a spring assembly of this character which will be simple and inexpensive to construct, positive in action, efficient and durable in service, and a general improvement in the art.

Figure 2:
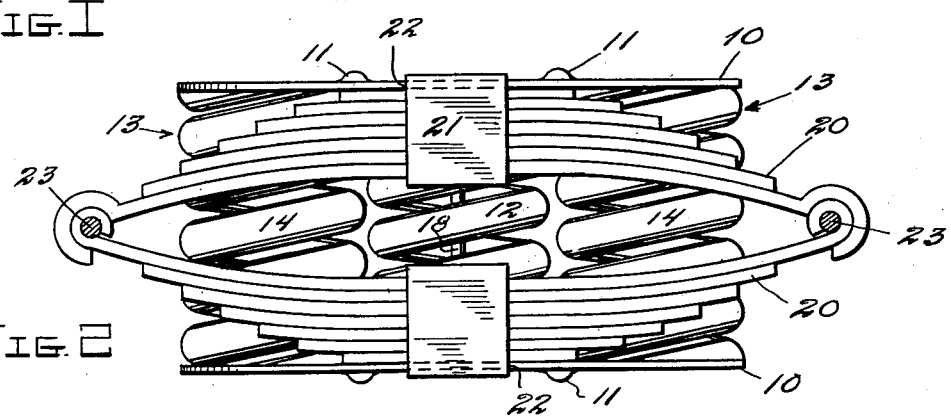
Figure 3:
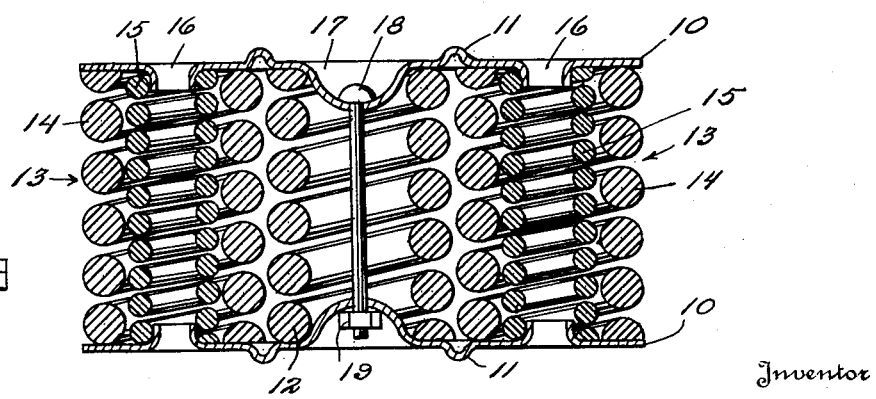

To the attainment of the foregoing and other objects and advantages, the invention preferably consists in the details of construction and the arrangement and combination of parts to be hereinafter more fully described and claimed, and illustrated in the accompanying drawing in which:

Figure 1 is a top plan view of a spring assembly constructed in accordance with my invention, Figure 2 is a side elevation thereof, and Figure 3 is a longitudinal section taken on the line 3—3 of Figure 1.

Referring more particularly to the drawing, I have shown a nest comprising top and bottom caps 10 which are similar and which are here represented as of substantially diamond shape with rounded corners. Moreover the caps are preferably formed with the usual tits or projections 11 adapted to enter within holes or recesses in the spring seat and bolster, not shown, for the purpose of holding the nest against displacement in service. Interposed between these caps are helical spring units 12 and 13, the former consisting preferably of a single standard A. R. A. outer coil and the latter consisting of either a single outer coil 14 for light cars, say the forty ton variety, or of the outer coils 14 and standard inner coils 15 for heavier cars of say the fifty-five ton type. In the present instance I have disclosed an arrangement particularly adapted for the latter mentioned type of car and have consequently illustrated the units 13 as comprising double coils. The spring caps are formed with stamped-out flanges 16 entering the ends of the units 13 for retaining them in place and are also formed centrally with stamped-out cup or socket portions 17 entering and centering the spring 12 and connected as by a tie bolt 18 equipped with a nut 19, this tie operating to hold the entire nest assembled prior to installation within the truck. These cup-like portions 17 are the same as provided in standard nests and project toward each other sufficiently or are depressed to such a distance with respect to the caps to permit full closure of the springs without the tie bolt or its nut contacting the spring seat or the bolster.

In conjunction with the helical spring units I make use of a pair of elliptic springs 20 located between the springs caps and equipped centrally with the ordinary type of bands 21 accommodated within notches or openings 22 in the caps. It is intended that the bands be of greater thickness than the material of the caps so as to project therebeyond as clearly illustrated in Figure 2 so that when the assembly is placed within a truck compressive force will be applied first to the bands and consequently the elliptic springs so that the latter will have an initial compression or be deflected for a portion of their travel before the helical spring units are energized. For maintaining the elliptic springs in assembled relation to the remainder of the nest I may simply provide tie bolts 23 extending through the ends of and traversing the space between the elliptic springs. Any means whatsoever may be resorted to for preventing relative longitudinal displacement of the individual leaves of the elliptic springs such, for instance, as the coacting pressed out "buttons" commonly provided in leaf spring structures, though it should be understood that any other equivalent expedient may be resorted to if desired. Clearly the individual leaves are prevented by the bands from relative lateral displacement. On account of the provision of the ties 23 and the fitting engagement of the bands within the notches 22 in the spring caps the elliptic springs cannot become bodily displaced in any direction. On account of these various features above mentioned it is clear that the assembly constitutes a complete entity which may be handled freely during transportation or at any time prior to installation within a truck.

While dimensions are not in any way of the essence of the invention it might be mentioned that by properly proportioning the parts the assembly may be used in a standard truck to replace the ordinary type of helical spring nest. Obviously under special conditions the dimensions and proportions may be varied to fit different circumstances and all such variations are contemplated as within the purview of the invention.

In the operation, it will be seen that when the assembly is installed and the weight of the bolster and the load comes upon it the elliptic springs 20 are initially compressed, the travel equalling the degree of projection of the bands 21 beyond the caps. The helical spring units are then of course also deflected. After this initial compression of the elliptic springs it is clear that they will be deflected in parallel with the helical springs. In service it will be understood that as the elliptic springs have a different natural period of vibration from that of the helical units each type of spring will act as a check upon the other so that there will be no synchronization of vibration, thereby avoiding the building up of the vertical oscillations or destructive jiggle.

Another great feature of advantage is that the ultimate capacity of the assembly is far greater than that of the ordinary spring nest wherein single, double, or a combination of both, helical coils are provided. For instance if the elliptic springs 20 be made of stock 2½ inches wide by ⅜ inches thick these springs will have each a capacity of 11,000 pounds and the outer helical coils 12 and 13, of standard design, will have each a capacity of 12,500 pounds. In addition, the inner coils 15 have each a capacity of 3500 pounds. It will therefore be seen that the total capacity of an assembly constructed in this manner and of the dimensions indicated will have a total capacity of 66,500 pounds of which the capacity of the elliptic springs constitutes substantially 34% which is a very large proportion, in fact greater than that in other elliptic and coil spring combinations which have been heretofore proposed. The advantage of this is that the elliptic springs are known to give an unusually free and easy ride in contradistinction to the more abrupt or jerky action of helical springs. By increasing the proportion of elliptic spring capacity as compared with the helical, the easy riding qualities are greatly increased so that there will be no stiffness under light loads. At the same time, the increase in the total capacity will take care of even the heaviest loads so that there will be no danger of over-stressing any of the springs. The feature of the elimination of jiggle has already been discussed and it is consequently believed that from the foregoing the construction, operation and advantages will be readily apparent to one skilled in the art without further explanation.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. A railway car truck spring comprising a plurality of helical and elliptic springs, the helical springs being located between the elliptic springs, spring caps having means for centering the helical springs and other means provided by the spring caps for maintaining association of the elliptic springs therewith in three directions, tie means between the elliptic springs for maintaining said association of spring caps and elliptic springs, and other tie means coacting with the caps for maintaining the same in parallel assembly.

2. A railway car truck spring comprising a plurality of helical springs arranged in alignment, elliptic springs outwardly disposed therefrom in spaced, parallel relation, said elliptic springs comprising a plurality of leaves held by bands, spring caps having means for centering the helical springs in all directions and for maintaining the spaced relationship of the elliptic springs in three directions by coacting with three sides of the spring bands, and tie means between the elliptic springs for maintaining the same against movement in the fourth direction.

3. A spring device adapted for assembly as a unit with a car truck side frame having a window opening, comprising top and bottom members, spring means arranged between said members comprising helical and elliptic springs, said elliptic springs being arranged in spaced, parallel relation and being separated by a plurality of helical springs in an aligned row, means formed on said members for holding the springs in the arrangement specified against interference with each other, tie means between the elliptic springs for preventing lateral separation of the same, and tie means for holding said members against separation and in assembled relation to said spring means.

4. A railway car truck spring comprising a plurality of helical springs, elliptic springs outwardly disposed of the helical springs, said elliptic springs comprising a plurality of leaves held by bands, spring caps having means for centering the helical springs in all directions and for maintaining the spaced relationship of the elliptic springs in three directions by coacting with three sides of the spring bands thereof, and tie means between the elliptic springs for maintaining the same against movement in the fourth direction, the parts being so constructed, arranged, proportioned, and dimensioned as to be capable of insertion as a unit in the window opening of a truck side frame with the elliptic springs extending transversely thereof.

5. A railway car truck spring comprising a plurality of helical and a pair of elliptic springs, the helical springs being aligned transversely of the device and the elliptic springs having their longitudinal axes parallel with each other and disposed outwardly of the helical springs, flat spring caps having means for centering the helical springs and other means provided by the spring caps for maintaining association of both elliptic springs therewith in three directions, tie means between the elliptic springs for maintaining said association of the spring caps and elliptic springs, and other tie means coacting with the caps for maintaining the same in parallel assembly.

6. A railway car truck spring comprising a plurality of helical springs, elliptic springs outwardly disposed from the helical springs, said elliptic springs each comprising a plurality of leaves held by a band, spring caps having means for centering the helical springs in all directions and cut-out portions for maintaining the spaced relationship of the elliptic springs in three directions by coacting with three sides of the spring bands, and tie means between the elliptic springs for maintaining the same against movement in the fourth direction.

7. A spring device adapted for insertion in the window opening of a car truck side frame comprising top and bottom members, spring means arranged between said members comprising helical and elliptic springs, said elliptic springs being arranged in spaced relation and separated by a plurality of helical springs, means formed on said members for holding the springs in the arrangement specified against interference with each other, tie means between the elliptic springs for preventing lateral separation of the same, and tie means for holding said members against separation and in assembled relation to said spring means.

8. A railway truck spring unit comprising a plurality of helical and elliptic springs operating in parallel under the applied load, spring caps for the unit, said caps having means for centering the helical springs and other means provided by the spring caps for maintaining association of the elliptic springs therewith in three directions, tie means between the elliptic springs for maintaining the same against movement in the fourth direction, and means connecting the caps for maintaining the unit in assembled relation.

9. A railway truck spring unit comprising a set of helical springs, a set of elliptic springs, one of said sets intervening between the springs of the other set, spring caps for the unit, said caps having means for centering the helical springs and other means provided by the spring caps for maintaining association of the elliptic springs therewith in three directions, tie means between the elliptic springs for maintaining the same against movement in the fourth direction, and means connecting the caps for maintaining the unit in assembled relation.

10. A railway truck spring unit comprising a plurality of helical and elliptic springs operating in parallel under the applied load, each elliptic spring comprising a plurality of leaves held together by a band, spring caps for the unit, said caps having means for centering the helical springs and other means provided by the spring caps for maintaining association of the elliptic springs therewith in three directions by coacting with three sides of each spring band, tie means between the elliptic springs for maintaining the same against movement in the fourth direction, and means connecting the caps for maintaining the unit in assembled relation.

11. A railway truck spring unit comprising a plurality of springs, a pair of which are of the elliptic leaf type spaced apart to intermediately receive other springs, upper and lower spring caps engaging all said springs and provided with means for restraining the intermediate springs against shifting in all directions, the elliptic springs having means to secure the leaves thereof in assembled relation, means formed on the caps for engaging the securing means to prevent movement of the elliptic springs in three directions, the means connecting the elliptic springs to prevent movement thereof in a fourth direction and retaining the means on the caps and the leaf securing means in engagement, and means for connecting the caps for maintaining the unit in assembled relation.

12. A railway truck spring unit comprising a plurality of springs, a pair of which are of the elliptic type spaced apart to intermediately receive other springs, upper and lower spring caps having means for restraining the intermediate springs against shifting in all directions and other means provided by the spring caps for maintaining association of the elliptic springs therewith in three directions, tie means between the elliptic springs for maintaining said association of spring caps and elliptic springs, and other tie means coacting with the caps for maintaining the unit in assembled relation.

13. A railway truck spring unit comprising a plurality of springs operating in parallel under the applied load, a pair of the springs being of the elliptic type and spaced apart to intermediately receive other springs, spring caps for the unit having means for restraining the intermediate springs against shifting in all directions and other means provided by the spring caps for maintaining association of the elliptic springs therewith in three directions, tie means between the elliptic springs for maintaining the same against movement in the fourth direction, and means connecting the caps for maintaining the unit in assembled relation.

PERCY R. DRENNING.